(12) United States Patent
Burghout et al.

(10) Patent No.: US 12,329,119 B2
(45) Date of Patent: Jun. 17, 2025

(54) CHEESE RIPENING

(71) Applicant: FrieslandCampina Nederland B.V., Amersfoort (NL)

(72) Inventors: Herman Frank Burghout, Wageningen (NL); Johannes Antonius Penders, Wageningen (NL)

(*) Notice: Subject to any disclaimer, the term of this patent is extended or adjusted under 35 U.S.C. 154(b) by 27 days.

(21) Appl. No.: 17/621,526

(22) PCT Filed: Jul. 8, 2020

(86) PCT No.: PCT/EP2020/069168
§ 371 (c)(1),
(2) Date: Dec. 21, 2021

(87) PCT Pub. No.: WO2021/005079
PCT Pub. Date: Jan. 14, 2021

(65) Prior Publication Data
US 2022/0346344 A1 Nov. 3, 2022

(30) Foreign Application Priority Data
Jul. 9, 2019 (EP) ..................................... 19185103

(51) Int. Cl.
*A01J 27/02* (2006.01)
*A01J 25/16* (2006.01)
*A23C 19/16* (2006.01)

(52) U.S. Cl.
CPC ............... *A01J 25/16* (2013.01); *A01J 27/02* (2013.01); *A23C 19/16* (2013.01)

(58) Field of Classification Search
CPC ......... A23C 19/16; A23C 19/163; A01J 27/02
See application file for complete search history.

(56) References Cited

FOREIGN PATENT DOCUMENTS

| EP | 2186417 A2 | 5/2010 |
|---|---|---|
| EP | 2186417 A3 | 8/2011 |
| EP | 3117715 | 1/2017 |
| WO | 2005067726 | 7/2005 |
| WO | 2006056561 | 6/2006 |
| WO | 2008110550 | 9/2008 |
| WO | 2019174760 | 9/2019 |

OTHER PUBLICATIONS

Dusterhoft "Dutch-type Cheese" in Encyclopedia of dairy sciences 2nd Ed. Elsevier, by Fox, 2011, pp. 721-727 (Year: 2011).*
International Search Report and Written Opinion mailed Aug. 7, 2020; PCT/EP2020/069168 (10 pgs.).

* cited by examiner

*Primary Examiner* — Changqing Li
(74) *Attorney, Agent, or Firm* — Fitch, Even, Tabin & Flannery LLP

(57) ABSTRACT

The present disclosure relates to a naturally ripened, block-shaped cheese of the hard or semi-hard type comprising a water-permeable coating applied onto the entire surface of the cheese and a water-impermeable material applied onto the water-permeable coating, wherein at least all vertices and the four edges that connect the top face and bottom face of the block-shaped coated cheese are covered with a layer of the water-impermeable material while leaving the bottom face and top face of the block-shaped coated cheese largely uncovered. The present disclosure also relates to a method of making the naturally ripened, block-shaped cheese of the hard or semi-hard type.

14 Claims, 1 Drawing Sheet

CHEESE RIPENING

CROSS REFERENCE TO RELATED APPLICATIONS

Figure 1:
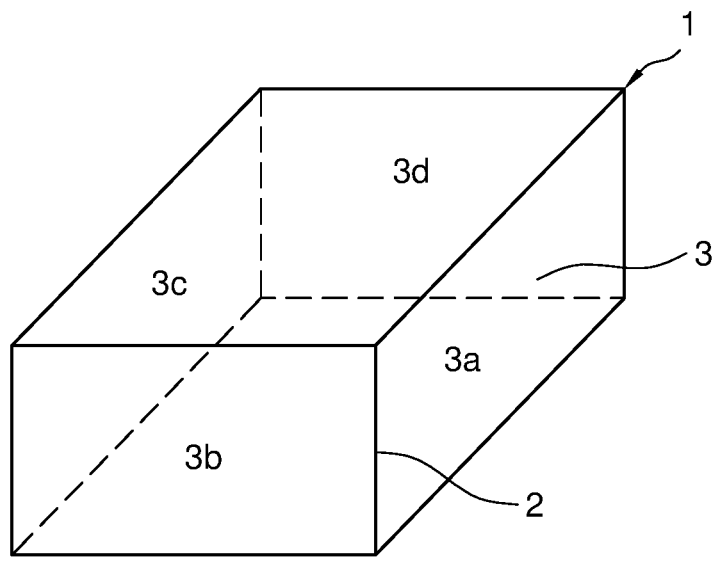

This application is a U.S. national phase application of International Application No. PCT/EP2020/069168, filed Jul. 8, 2020, which claims benefit from European Application No. 19185103.9, filed Jul. 9, 2019, which are each hereby incorporated herein by reference in their entirety.

FIELD OF THE INVENTION

The invention relates to the field of cheesemaking. In particular, it relates to methods for providing a naturally ripened hard or semi-hard chees, and to a ripened cheese obtainable by the method.

BACKGROUND TO THE INVENTION

In general, most cheesemaking operations include the steps of providing a cheesemaking media, inoculating the media with an acid-producing microorganism, and forming a coagulum. The coagulum is cut to provide curd and whey, whereupon the curd is separated from the whey and subsequently, the whey is drained from the curd. The curd is pressed and then packed into a suitable form to provide a cohesive mass which, upon some ripening, becomes a cheese. Variations in one or more of the above steps for producing cheese result in production of the many varieties of cheese which are known. For example, in the case of a semi-hard or hard type cheese like Gouda cheese, the curd is pressed in a cheese mould and then transferred to the brine. The cheeses are left to soak in the brine for a time interval in the order of days and are then transferred to the warehouse for further ripening. During the ripening of the cheese the organoleptic quality of the cheese is developed.

In a conventional ripening method of a semi-hard or hard cheese, after brining, the young cheese is ripened at about 13 to 18° C. at a relative humidity of 70 to 80%, typically to an age of minimally four weeks for a young cheese and a year or more for an old cheese. During this ripening, also referred to in the art as "standard ripening" or "natural ripening", the outside of the young cheese is provided with a conventional cheese covering means to protect the rind. Such cheese covering means typically is a coating of polyvinylacetate or some other water-permeable polymeric material, such as polysaccharides or polyethylene acetate. During the ripening process, the cheese loses moisture by water evaporation.

During natural ripening, the traditionally wheel- or cylindrically-shaped cheese is stored on (wooden) shelves. In the temperature and humidity controlled rooms where cheeses are aged, air naturally dries out the outside of cheese. Over time, this forms a crust on the outside of the cheese which becomes its rind. Cheesemakers monitor this process. The cheese is regularly turned, so that the upper and bottom sides are exposed to the air with intervals, while the "band" or circumference representing about 40% of the total surface area of the cheese, has no contact with the cheese shelves. This band area is continuously exposed to the air. As a consequence, the band area loses more water with the result that a dry and dark colored zone up to 7-8 mm or more e.g. 15-20 mm for an old cheese, and having an unattractive, chewy structure is formed.

EP-A-2 186 417 discloses a method for applying a semi-permeable coating to a cheese with variable coating layer thicknesses. Those surfaces of the cheese that show a higher moisture loss during ripening are provided with a thicker coating layer than the surfaces of the cheese having a lower moisture loss. The effect is a more uniform drying-in.

Alternatively, the young cheese is packaged in foil and is then ripened at a temperature of 4 to 7° C. to produce a rindless cheese of the semi-hard or hard type. This process is referred to as foil-ripening. A practical advantage is that a foil-ripened cheese, which often is block-shaped, gives no or hardly any cutting losses when cut to slices or bars. By comparison, the cutting loss with standard ripened cheese, also indicated with the term "naturally ripened cheese", can run up to as much as 15%. Additionally, cheese ripened in this manner loses no moisture during ripening which is, in particular, of economic advantage.

However, a disadvantage of foil-ripening is that, due to the different ripening conditions, the cheese also undergoes a different type of ripening process. With this different type of ripening, the development of flavor lags. Merely increasing the ripening temperature to 12-14° C. as used in standard, natural ripening is no option, since in that case a bitter flavor develops. Additionally, ripening a cheese in foil at those temperatures produces a product having an undesired consistency. Typically, the structure or texture of such cheese is experienced as being either too sandy or too soft. Thus, foil ripening is unsuitable for traditionally ripening of hard or semi-hard cheeses.

Given the consumer's ever increasing preference for the taste and structure of naturally ripened cheeses, whilst at the same time minimizing cutting losses, the present inventors sought to improve the natural ripening process whilst using a cheese shape that minimizes cutting losses. More in particular, they aimed at developing a block-shaped natural semi-hard or hard cheese which can essentially be cut and sliced as easily as a foil-ripened cheese while not sacrificing the desired organoleptic properties of the cheese.

When ripening block-shaped cheese in a natural way, i.e. turning the cheese block, a dried, dark zone will develop particularly at the vertices and edges of the cheese block, in particular the edges perpendicular to the storage shelf on which the cheese block is put to ripen, but also at the faces of the block that are continuously exposed to air, i.e. the four faces that form the circumference of the block. Accordingly, it is a further object of the present invention to keep the dried, dark zones to a minimum, e.g. to less than 6 mm, preferably less than 5 mm. Furthermore, the method should be easy to use and suitable for large scale industrial application.

SUMMARY OF THE INVENTION

It was surprisingly found that the aforesaid goals could be met by selectively covering certain parts of the block-shaped cheese which are most prone to drying in with a water-impermeable material such that, during ripening, water evaporation from the cheese at those areas is minimized. The flat top and bottom faces of the block that are alternately in contact with the storage shelf during ripening remain largely uncovered with the coating layer of water-impermeable material.

The invention also relates to a naturally ripened, block-shaped cheese of the hard or semi-hard type that comprises a coating of a water-permeable material and, applied onto this coating, a partial cover of a water-impermeable material, wherein at least all vertices and the four edges that connect the top face and bottom face of the block-shaped cheese, and preferably all four faces that together form the circumferential surface of the block-shaped coated cheese, including all vertices and edges positioned therein, are covered with the water-impermeable material while leaving the bottom face and the oppositely positioned top face of the block-shaped coated cheese largely uncovered.

DETAILED DESCRIPTION

Accordingly, the invention relates to a method for providing a naturally ripened, cylindrically shaped cheese of the hard or semi-hard type, comprising the steps of:
(i) forming a block-shaped cheese from a curd by conventional means;
(ii) applying a protective water-permeable coating layer onto the entire surface of the cheese, thereby obtaining a coated cheese;
(iii) partially covering the coated cheese with a layer of a water-impermeable material thereby obtaining a partially covered coated cheese; and
(iv) allowing the partially covered coated cheese to ripen, wherein the block-shaped cheese comprises a top face, a bottom face and four faces that form the circumference of the block-shaped cheese, and
wherein in step (iii) at least all vertices and the four edges that connect the top face and bottom face of the block-shaped coated cheese are covered with the layer of the water-impermeable material while leaving the top face and bottom face largely uncovered.

The expression "block" or "block-shaped" as used herein refers to any cuboid shape i.e. any hexahedron having six faces, eight vertices and twelve edges, in particular a rectangular cuboid, i.e. a polyhedron in which all angles are right angles, all oppositely positioned faces are equal and all faces are rectangles. Preferred rectangular cuboids are those having six rectangular (non-square) faces, those having four rectangular (non-square)-shaped faces and two square faces and those having six square faces (i.e. cubes). FIG. 1 illustrates a typical cuboid shape that would qualify as "block-shaped" in the context of the present application. Such block has eight vertices (1), twelve edges (2) and six faces (3). In FIG. 1 the faces (3*a*), (3*b*), (3*c*) and 3*d*) together form the circumferential surface of the block.

The expression "coated cheese" as used herein refers to a cheese of which the entire outer surface is covered by a water-permeable coating layer.

The block-shaped cheese of the present invention comprises a top face and a bottom face and, consequently, four side faces that together form the circumferential surface of the block. The top and bottom face are those faces that are (alternately) in direct contact with the storage shelf during ripening and will typically be those faces having the largest surface of all six faces of the block. Exact dimensions can be selected as desired, influenced by factors such as e.g. end use of the cheese (for retail or businesses) and available equipment for turning the cheese during ripening and for providing the cheese with the water-impermeable layer. For example, suitable dimensions include blocks having dimensions (length×breadth×height) in the range of 30-60 cm×20-40 cm×5-20 cm, more suitably 40-55 cm×25-35 cm×8-15 cm. A particularly suitable dimension is approximately 50 cm×30 cm×10 cm. The top and bottom face would then be the largest faces, i.e. those having a surface of 50 cm×30 cm=150 $cm^2$.

Step (i) comprises the formation of a block-shaped cheese from a curd by conventional means, typically involving providing a conventional curd by inoculating a cheese making media with an acid-producing microorganism to form a coagulum, cutting the coagulum to provide curd and whey, and separating the curd from the whey; pressing and packing the curd into the desired block shape followed by transfer to a brine.

After the cheese is formed, a conventional water-permeable (plastic) coating layer is applied in step (ii) onto the entire surface of the cheese to offer surface protection against yeasts and moulds during cheese ripening. For example, a liquid coating comprising polyvinyl acetate (PVA) is applied directly to the surface of the whole cheese at the start of maturation. Such conventional PVA coatings are typically applied by applying PVA-based aqueous dispersions onto the cheese surface. The cheese subsequently passes through a coating machine with rotating flaps, which spread the dispersion evenly upon all faces of the block shaped-cheese. Upon drying, a coherent plastic film is formed that offers a protective coating against mechanical damage and reduces moisture evaporation to some extent. Nevertheless, it is important that the cheese can lose moisture during the natural ripening and some moisture, therefore, should be able to evaporate from the cheese through the coating. After a few days of ripening a second uniform water-permeable coating may be applied on the faces of the block-shaped cheese not facing the shelf on which it lies for ripening, typically by painting PVA or some other suitable water permeable coating material onto the cheese. Once dried, the cheese is turned and the now upwardly facing side of the cheese is provided with a second water permeable protective coating which is allowed to dry before the cheese is turned again. This process may be repeated several times during ripening. The protective coating may contain color and/or antifungal agent, such as natamycin. Suitable conventional coating materials are also disclosed in EP-A-2 186 417.

Figure 2:
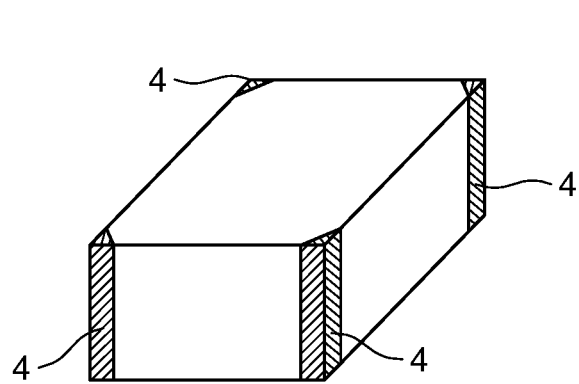

In step (iii) of the method of the invention the coated cheese obtained in step (ii) is partially covered with a layer (or "cover" or "further coating") of a water-impermeable material such that at least all vertices and the four edges that connect the top face and bottom face of the block-shaped coated cheese are covered with the layer of the water-impermeable material while leaving the top face and bottom face largely uncovered. In a preferred embodiment the two oppositely positioned largest faces of the four faces that together form the circumferential surface of the block-shaped cheese, including all vertices and edges positioned therein, are entirely covered with the layer of the water-impermeable material. In a further preferred embodiment all four faces that together form the circumferential surface of the block-shaped cheese, including all vertices and edges positioned therein, are entirely covered with the layer of the water-impermeable material. This is illustrated by FIG. 2 (all vertices and edges connecting top and bottom face covered with a wax layer (4)) and FIG. 3 (all faces that form the circumferential surface are covered with a wax layer (5) including a small edge of wax (6) on top and bottom face). The reference to "largely" uncovered will be understood by those skilled in the art to mean that the central part of the top and bottom face of the cheese block will be uncovered while a triangular-shaped part in each corner of the top and bottom face is covered with a layer of the water-impermeable material. See FIG. 2. In the preferred embodiment mentioned above, "largely" uncovered refers to the central rectangular-shaped part of the top and bottom face that remains uncovered. In such embodiment only the edges of the top and bottom face are covered with a layer of the water-impermeable material. See FIG. 3. Typically this means that at least 80%, and suitably at least 90%, of the surface of the top and bottom face of the cheese block will remain uncovered.

The resulting partially covered coated cheese is subsequently allowed to further ripen in step (iv) by exposure to air. Due to the further layer of water-impermeable material applied, any moisture evaporating from the ripening cheese can now only leave the cheese through that part of the cheese surface which is not covered by this further layer and which is not in contact with the shelf on which the cheese is stored during ripening. As a result, less moisture will leave the cheese and the thickness of the dried, dark zone of the cheese which is observed in conventionally ripened natural cheeses is reduced significantly, thereby facilitating cutting and slicing of the cheese and minimizing cutting losses.

Depending on the desired effect, the layer of water-impermeable material can be applied directly after brining or at any other time point during the ripening process. For a young cheese, it may suitably be applied after 2 weeks following brining. For a more mature cheese, the further coating can be applied later e.g. after 4, 8, 12 or 24 weeks, preferably after 4, 6 or 8 weeks by which time sufficient crust has formed. The time period during which the cheese is partially covered by the layer of water-impermeable material can vary according to specific circumstances, like the type of cheese, the ripening conditions and/or the desired degree of maturation. In one embodiment, the layer of water-impermeable material is present during at least 4 weeks of ripening, preferably 5, more preferably 6 weeks of ripening. It can remain present as long as desired, e.g. up to 16 weeks of ripening or even longer.

The materials used for the further layer should be water-impermeable, thereby preventing moisture to leave the cheese where such further coating is applied. In one embodiment the water-impermeable material applied is wax. In principle any wax that is impermeable and can be applied onto cheese can be used. Such waxes are known in the art and include paraffin wax and cheese wax. Suitable materials are also disclosed in EP-A-2 186 417 and include mono- and diglycerides having a melting temperature above 30° C., acetylated mono- and/or diglycerides and mixtures of one or more of these. An example of a suitable 5 cheese wax are Paradip™ waxes, such as Paradip™ NW yellow 5990, Paradip Nowax™ and Paradip™ KS1/KS2.

The wax layer can be applied in step (iii) by any suitable method. For example, step (iii) may comprise smearing wax onto the vertices and edges connecting top and bottom face of the cheese block or onto the four faces that form the circumferential surface of the cheese block. In a preferred method the contacting with liquid wax is performed by successively clipping those parts of the block-shaped coated cheese to be covered with a layer of wax in a bath of liquid wax and allowing the wax to dry. Accordingly, that implies successively dipping anyhow the four edges connecting the top and bottom face of the cheese block, and possibly the two largest oppositely positioned side faces or all four side faces (i.e. the faces that form the circumferential surface of the block-shaped cheese), in a bath of liquid wax and allowing the wax to dry. Dipping time per face may vary, inter alia depending on the amount of wax and hence thickness of the wax layer to be applied. Typical dipping time per face may range from 5 seconds to 1 minute, suitably from 10 seconds to 30 seconds. Each face may be dipped more than once, for example 2 or 3 times. In case of multiple dips per face, some time is allowed between two successive dips to allow the wax to dry. Depending on the type of wax used this may typically take between 10 seconds and 2 minutes. In a further embodiment the four circumferential faces may be successively dipped once first, after which at least one further round of successive dipping is performed. The dipping is suitably performed by a robotic arm programmed for such dipping action. The liquid wax can subsequently be allowed to dry, either by enforced cooling or by unenforced cooling.

The amount of wax to be applied as the wax layer may vary within wide limits. However, it was found that good results are obtained when using an amount of wax on that part of the cheese to be covered with the further layer in the range of from 20 to 100 milligrams of wax per square centimeter of cheese ($mg/cm^2$), suitably 30 to 90 $mg/cm^2$, more suitably 40 to 80 $mg/cm^2$ and most suitably 50 to 70 $mg/cm^2$.

Step (iv) of a method provided herein comprises allowing the partially enclosed cheese to ripen in the conventional way, typically by exposure to air. During such conventional ripening the parts of the cheese block not covered by wax and exposed to air are suitably provided with at least one further thin layer of water-permeable coating. More suitably, each time the cheese block is turned, the parts of the cheese block not covered by wax and exposed to air are provided with a thin layer of water-permeable coating. Such procedure is well known in the art.

The partial covering of the block-shaped coated cheese with a further water-impermeable coating layer can significantly prevent the weight loss during cheese ripening. For example, it can result in a weight loss of less than 4%, preferably less than 3%, during a ripening period of about 6 weeks, or less than 5%, preferably less than 4%, during a ripening period of about 8 weeks.

The invention also provides a naturally ripened, block-shaped cheese of the hard or semi-hard type comprising a water-permeable coating applied onto the entire surface of the cheese and a water-impermeable material applied onto the water-permeable coating, wherein at least all vertices and the four edges that connect the top face and bottom face of the block-shaped coated cheese are covered with a layer of the water-impermeable material, preferably wax, while leaving the bottom face and top face of the block-shaped coated cheese largely uncovered. In a preferred embodiment, the two oppositely positioned largest faces of the four faces that together form the circumferential surface of the block-shaped coated cheese, and preferably all four faces that together form the circumferential surface of the block-shaped coated cheese, including all vertices and edges positioned therein, are entirely covered with a layer of the water-impermeable material. Such cheese can be obtained using the method of the invention as described hereinbefore.

The concept of the present invention is applicable to any type of block-shaped cheese. Accordingly, the present invention is suitably applied for full fat cheeses, notably 48+-cheese, such as Gouda cheese. However, its advantages are most pronounced for a low fat cheese, preferably a 30+-cheese made from skimmed or semi-skimmed milk. For example, in one embodiment the invention relates to a naturally ripened, block-shaped cheese of Milner type or any similar cheese characterized by less fat and full flavor, with only a minimal dried, dark zone at the vertices and edges, and suitably at the entire circumferential surface of the cheese.

The invention is further illustrated by the following examples without limiting the invention to these specific embodiments.

LEGEND TO THE FIGURES

FIG. 1: Schematic representation of a block-shaped cheese indicating all vertices, edges and faces.

FIG. 2: Schematic representation of a block-shaped cheese with a layer of water-impermeable material at the vertices and edges connecting top and bottom layer.

Figure 3:
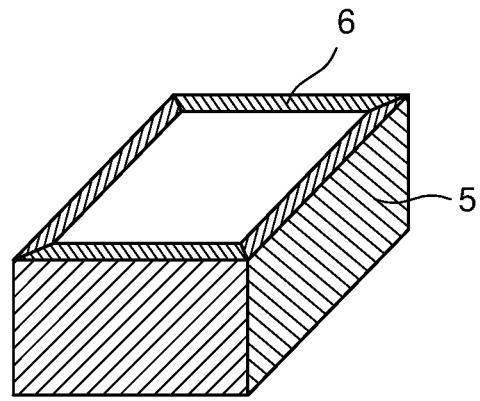

FIG. 3: Schematic representation of a block-shaped cheese with a layer of water-impermeable material at the faces that form the circumferential surface of the block-shaped cheese.

EXAMPLES

Example 1

Following brining a block-shaped cheeses of the Gouda 48+ type (dimensions: 50 cm×30 cm×10 cm) were placed on a storage shelf in a ripening cell that was kept at about 13° C. (relative humidity approximately 80%). The uncovered faces of the block were provided with a conventional thin layer of water-permeable polyvinyl-acetate (PVA) cheese coating. Every 3 to 4 days the cheese block was turned and following such turning all faces exposed to air were covered with a further thin layer of PVA coating. After 14 days of ripening the cheese block was subsequently provided with a layer of a water impermeable formulated cheese wax based on acetoglycerides (Paradip Nowax®) on the four faces that formed the circumferential surface of the block (i.e. the faces of 10 cm×30 cm and of 10 cm×50 cm, including the edges and vertices).

At the age of 4 weeks one cheese block was processed into pre-packaged, rindless slices and pre-packaged into smaller blocks. The same procedure was repeated with the other cheese blocks at the ages of respectively 8, 16, 24 and 34 weeks. When compared with Gouda 48+ cheese blocks from the same production round which were not provided with a wax layer (reference cheese blocks), the cheese blocks with the wax layer exhibited a significantly thinner dry and dark colored zone at the circumferential faces of the block, indicating less evaporation of water from the cheese during ripening. Moisture content of the wax coated cheese blocks was also significantly higher than in the reference cheese blocks.

Example 2

The procedure of Example 1 was repeated, but this time with 30+ cheese blocks (Milner) of the same dimensions.

In this case after two dipping rounds approximately 110 grams of Paradip Nowax® wax was applied in total onto the circumferential faces of each cheese block.

The cheese blocks with the wax layer exhibited a significantly thinner dry and dark colored zone at the circumferential faces of the block than rthe reference cheese blocks without the wax layer, indicating less evaporation of water from the cheese during ripening. Moisture content of the wax coated cheese blocks was also significantly higher than in the reference cheese blocks.

Example 3

Block-shaped cheeses of the Gouda 48+ type (dimensions: 50 cm×30 cm×10 cm) were prepared and allowed to ripen for 14 days in the same way as described in Example 1.

Following these 14 days of ripening the 4 edges connecting top and bottom face, including the 8 vertices, of each cheese block (as illustrated schematically by FIG. 2) were successively dipped into the hot Paradip Nowax® wax using a robotic arm programmed to perform this dipping operation. This procedure was repeated once, so that each vertex was dipped twice in the hot wax. In total an amount of about 20 grams of Paradip Nowax® wax was applied on each cheese block.

Following ripening according to the procedure described in Example 1, the cheese blocks with the wax-covered vertices showed significantly less dry and dark zones in the corners at the vertices, when cut into slices, thus leading to less cutting losses.

Example 4

The procedure of Example 3 was repeated, but this time with 30+ cheese blocks (Milner) of the same dimensions.

In this case after two dipping rounds approximately 21 grams of Paradip Nowax® wax was applied in total onto the vertices of each cheese block.

Results were similar as for the Gouda 48+ cheese blocks of Example 3.

The invention claimed is:

1. A method for providing a naturally ripened, partially covered and coated, block-shaped cheese of hard or semi-hard type, comprising the steps of:
   (i) forming a block-shaped cheese from a curd by a process comprising inoculating a cheese making media with an acid-producing microorganism to form a coagulum, cutting the coagulum to provide curd and whey, and separating the curd from the whey, pressing the curd into a block shape and brining the block-shaped cheese thus obtained;
   (ii) applying a protective water-permeable coating layer onto the entire surface of the block-shaped cheese, thereby obtaining a coated block-shaped cheese;
   (iii) partially covering the coated block-shaped cheese with a layer of a water-impermeable material thereby obtaining a partially covered and coated block-shaped cheese; and
   (iv) allowing the partially covered and coated block-shaped cheese to ripen,
   wherein the partially covered and coated block-shaped cheese comprises a top face, a bottom face and four faces that form the circumference of the partially covered and coated block-shaped cheese, and
   wherein in step (iii) at least all vertices and the four edges that connect the top face and bottom face of the block-shaped coated cheese are covered with the layer of the water-impermeable material while leaving at least 80% of the top face and bottom face uncovered.

2. The method according to claim 1, wherein in step (iii) the two oppositely positioned largest faces of the four faces that together form the circumferential surface of the block-shaped cheese, including all vertices and edges positioned therein, are entirely covered with the layer of the water-impermeable material.

3. The method according to claim 1, wherein step (iii) is carried out at least 2 weeks after step (ii).

4. The method according to claim 1, wherein the water-impermeable material is wax.

5. The method according to claim 4, wherein covering with the wax in step (iii) is performed by successively dipping those parts of the block-shaped coated cheese to be covered with a layer of the wax in a bath of the wax and allowing the wax to dry.

6. The method according to claim 1, wherein in step (iii) all four faces that together form the circumferential surface of the block-shaped cheese, including all vertices and edges positioned therein, are entirely covered with the layer of the water-impermeable material.

7. The method according to claim 1, wherein step (iii) is carried out at least 4 weeks after step (ii).

8. A naturally ripened, block-shaped cheese of the hard or semi-hard type comprising a water-permeable coating applied onto the entire surface of the naturally ripened block-shaped cheese and a water-impermeable material applied onto the water-permeable coating, wherein at least all vertices and the four edges that connect the top face and bottom face of the naturally ripened block-shaped coated cheese are covered with a layer of the water-impermeable material while leaving at least 80% of the bottom face and top face of the naturally ripened block-shaped coated cheese uncovered.

9. The cheese according to claim 8, wherein the two oppositely positioned largest faces of the four faces that together form the circumferential surface of the block-shaped coated cheese, including all vertices and edges positioned therein, are entirely covered with the layer of the water-impermeable material.

10. The cheese according to claim 8, wherein the cheese is a low fat cheese.

11. The cheese according to claim 8, wherein the cheese is a full fat cheese.

12. The cheese according to claim 8, wherein all four faces that together form the circumferential surface of the block-shaped coated cheese, including all vertices and edges positioned therein, are entirely covered with the layer of the water-impermeable material.

13. The cheese according to claim 8, wherein the cheese is a 30+-cheese made from skimmed or semi-skimmed milk.

14. The cheese according to claim 8, wherein the cheese is a 48+-cheese.

\* \* \* \* \*